United States Patent Office 3,515,188
Patented June 2, 1970

3,515,188
PREPARED CITRUS FRUIT PROCESSING
APPARATUS
Yonekichi Morikawa, Shimizu, and Kunro Takano,
Takaishi, Japan, assignors to Daiwa Can Co. Ltd.,
Tokyo, Japan
Filed Aug. 21, 1968, Ser. No. 754,239
Int. Cl. A47j 17/00
U.S. Cl. 146—3
4 Claims

ABSTRACT OF THE DISCLOSURE

An apparatus for processing a prepared citrus fruit comprising a framework; a pair of laterally spaced parallel chain conveyors trained over sprocket wheels rotatably mounted on said framework at the inlet and discharge ends of said apparatus, each chain conveyor having the upper run travelling from said inlet end to said discharge end; drive means journalled in said framework for driving said sprocket wheels; a plurality of fruit processing means rockably supported on said chain conveyors in an end-to-end spaced relation to one another; and a hopper for receiving a supply of said prepared citrus fruit and discharging said fruit onto selected ones of said fruit processing means, each of said fruit processing means comprising plural pairs of rolls each pair including two differently and compensatively shaped adjacent rolls adapted to rotate in the opposite direction to one another.

BACKGROUND OF THE INVENTION

In the cannery for citrus fruits a great number of prepared citrus fruits have to be stripped of their loculi per day and accordingly, the canning industry has longed for a citrus fruit processing apparatus which can strip a great number of prepared citrus fruits of their loculi in a continuous and economical manner within a predetermined short period of time. However, up to date, the industry has failed to develop a versatile citrus fruit processing apparatus as expected for by the industry because variations in the dimensions of such fruits and variations in the hardness of the loculi of the fruits have prevented complete and satisfactory stripping of the fruits by the apparatus.

SUMMARY OF THE INVENTION

Therefore, the present invention is to provide a highly efficient and economical apparatus for processing or stripping prepared citrus fruits of their loculi which can continuously and satisfactorily strip such fruits of their loculi regardless of variations in the dimensions of the fruits and variations in the hardness of their loculi and which can effectively overcome the disadvantages inherent in the prior art prepared citrus fruits processing apparatus.

The term "prepared citrus fruits" employed in the specification and claims of this application means "citrus fruits which have been removed from their outer skins in a preliminary treatment step in the canning operation and their segmented fleshes are covered by only the loculi."

The apparatus by the present invention has the following features:

(1) As clearly distinguished from the same type prior art prepared citrus fruits processing or stripping apparatus which comprises a conveyor formed of a plurality of spaced cylindrical stripping rolls having a uniform diameter secured to the frames of the conveyor with their longitudinal axes disposed at right angles to the direction in which the conveyor moves and adapted to rotate about their axes for conveying the prepared fruits while stripping the fruits of their loculi which have been torn or not, the stripping rolls of the novel citrus fruits processing apparatus are not in the form of cylinder having a uniform diameter, but in the form of various complicatedly tapered configurations not parallel to their rotational axes. More specifically, the stripping rolls of the present invention are arranged in a plurality of pairs with their axes disposed parallel to and laterally spaced from one another each pair comprising two compensatively different-shaped engaging rolls.

(2) Plural pairs of such rolls are rotatably supported at the opposite ends by a pair of arc shaped side plates to form a fruit loculus removing or stripping unit with the axes of the various rolls disposed at different planes from each other and a plurality of such loculus removing units are rockably supported by parallel and laterally spaced chain conveyors in an end-to-end spaced relation for movement with the conveyors. As the chain conveyors move along a predetermined passage within the apparatus the loculus removing units supported thereby are moved together with the conveyors while individually rocking in contact with an undulating guide provided on the machine framework.

(3) A hopper having an intermittently openable bottom is provided adjacent to the inlet end of the apparatus for receiving a supply of citrus fruit from a suitable supply source and discharging the same onto two selected ones of the plural loculus removing units. The hopper bottom is intermittently opened in such a timed relation to the loculus removing units that during the removing units are moving together with the supporting chain conveyors while rocking in contact with the undulating guide, when the clearance between two selected loculus removing units becomes the minimum value sufficient to prevent the citrus fruit from falling into the clearance the bottom is opened to allow the fruit to fall onto the two loculus removing units bridging the clearance.

(4) In order to facilitate the stripping of the citrus fruit by the loculus removing units, a holding down device is disposed adjacent to and inwardly spaced from the hopper so that when the citrus fruit falls onto the selected two loculus removing units even if the material leaps up over the rolls of the removing unit or units because of the elasticity of the fruit the device holds down such a fruit against the adjacent rolls of the loculus removing units may positively nip the loculus and strip the fruit of the loculus as the loculus removing units continue to move along the passage within the apparatus.

According to the present invention, there is provided an apparatus for processing a prepared citrus fruit comprising a framework; a pair of parallel and laterally spaced chain conveyors trained over sprocket wheels rotationally mounted on said framework at the inlet and discharge ends of said apparatus for movement along a predetermined passage within the apparatus, each chain conveyor having the upper run travelling from said inlet end to said discharge end; drive means journalled in said framework for driving said sprocket wheels; a plurality of fruit processing means rockably supported on said chain conveyors in an end-to-end spaced relation; and a hopper disposed adjacent to and above said inlet end for receiving a supply of prepared fruit and discharging said fruit onto two selected ones of said fruit processing means, characterized by that each of said fruit processing means comprises plural pairs of side-by-side arranged rolls each pair including two compensatively different-shaped rolls which rotate in the opposite directions and each two adjacent rolls in each fruit processing means have compensatively different shapes and rotate in the opposite directions with a slight clearance therebetween so that the loculus of said fruit may be pinched by the opposite peripheral surfaces of the adjacent rolls as the rolls rotate in the opposite directions.

The above and other objects and attendant advantages of the present invention will be more readily apparent to those skilled in the art from the following description when read in connection with the accompanying drawings.

BRIEF DESCRIPTION OF THE DRAWINGS

The accompanying drawings illustrate a preferred form of citrus fruit processing apparatus constructed in accordance with the present invention in which.

PREFERRED EMBODIMENT OF THE INVENTION

Figure 1:
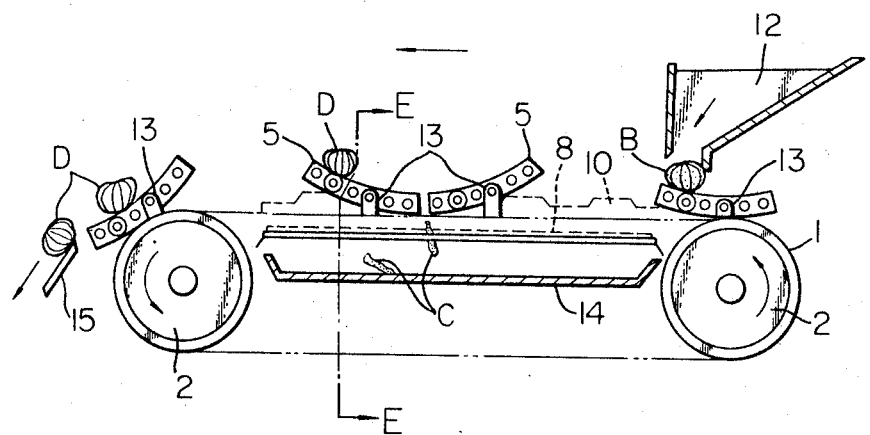
FIG. 1 is a schematic side elevational view of principal parts of said citrus fruit processing apparatus with some loculus removing units, parts of an undulating guide and machine framework removed therefrom.

Referring to various figures of the accompanying drawings in which a preferred form of citrus fruit processing apparatus by the present invention is schematically shown as being operated for stripping tangerines for illustration purpose only, but not for limiting the scope of the invention, the citrus fruit processing apparatus generally comprises a pair of parallel and laterally spaced endless chain conveyors 1 and 1' extending in the longitudinal direction of the apparatus and trained over two pairs of sprocket wheels 2, 2 and 2', 2', respectively, in the illustrated embodiment, one pair of longitudinally spaced sprocket wheels 2 and 2' are provided at the inlet and discharge ends on one side of the apparatus for supporting and guiding one conveyor 1 and the other pair of similarly spaced sprocket wheels 2 and 2' are provided at the inlet and discharge ends on the other side of the apparatus. The inlet end sprocket wheels 2 and 2' are supported by a transverse shaft for rotational movement therewith and similarly, the other inlet and discharge end sprocket wheels 2 and 2' are supported by a similar transverse shaft for rotational movement therewith. The inlet and discharge end transverse shafts are journalled in the framework of the apparatus (not shown) in a conventional manner. The chain conveyors 1 and 1' have a series of equally spaced support bearings 13 and 13' secured thereto, respectively and the support bearings in turn rotationally support the shafts 7 and 7' for a series of roll-type fruit loculus removing units A, respectively. The support bearings 13 and 13' extend outwardly and vertically from the outer surface of the conveyors 1 and 1', respectively.

The roll-type fruit loculus removing units A are rockably supported by the respectively associated shafts 7 and 7' which are in turn rotationally supported by the support bearings 13 and 13' and the loculus removing units are arranged in a slightly spaced end-to-end relation to one another with an equal distance therebetween along the chain conveyors 1 and 1' (in FIG. 1 alternate loculus removing units on the upper run and those on the lower run of the conveyors are being omitted for clarification of the illustration). As clearly shown in FIGS. 2 and 3, each roll-type fruit loculus removing unit A consists of three pairs of rolls in which each pair comprises two compensatively different-shaped rolls. In the illustrated embodiment, two centrally disposed adjacent different-shaped rolls 3 and 4 form a first pair, two adjacent different-shaped rolls 3' and 4' which are disposed on one side of the first pair of rolls 3 and 4 form a second pair and the remaining two adjacent different- shaped rolls 3'' and 4'' which are disposed on the other side of the first pair of rolls 3 and 4 form a third pair. The one rolls 3, 3' and 3'' in the three pairs of rolls have substantially the same tapered configuration with the smallest diameter center portion increasing the diameter toward the opposite ends and the other rolls 4, 4' and 4'' in the three pairs have substantially the same tapered configuration with the largest diameter center portion decreasing the diameter toward the opposite ends. More particularly, the oppositely directional taper configurations of the rolls 3, 3' and 3'' on one hand and the rolls 4, 4' and 4'' on the other hand compensate for each other and the individual rolls are disposed side by side with only a slight clearance provided therebetween just enough to nip the loculus of each segment of a plurality of segments in a tangerine there for the purpose to be described in detail hereinbelow. Although the two rolls in each pair are illustrated as having tapers in the opposite directions, these rolls may be of any other shapes provided that the two rolls in each pair have compensatively different shapes from each other with such a slight clearance therebetween and that the rolls have surfaces which are not parallel to the rotational axes of the rolls. Such modified forms of rolls are also suitably employed for the purpose of the present invention. The opposite ends of the shafts of these rolls 3, 3', 3'', 4, 4' and 4'' in each loculus removing unit A are journalled in a pair of opposite and parallel arc shaped plates 5 and 5' and the shaft of the roll 3 is operatively connected to the drive shaft 7 to be rotated thereby in a manner which will be described hereinbelow. The shafts of these loculus removing unit rolls are journalled in the arc shaped plates 5 and 5' with their axes positioned in substantially the center of the height of each arc shaped plate so that these rolls may be disposed different planes from one another because of the arc shape of the plate for the purpose to be described hereinbelow.

Figure 2:
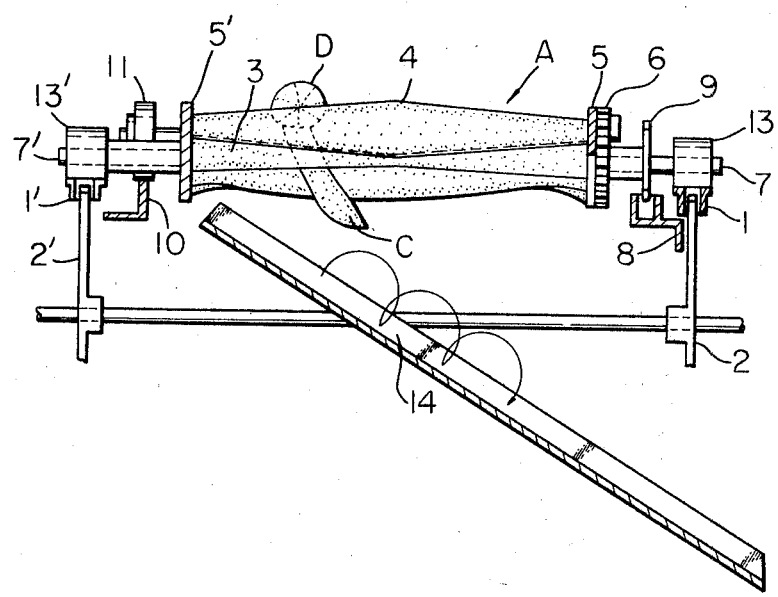
FIG. 2 is an enlarged scale cross-section view taken along the line E—E of FIG. 1 and as seen in the arrow direction therein.
Figure 3:
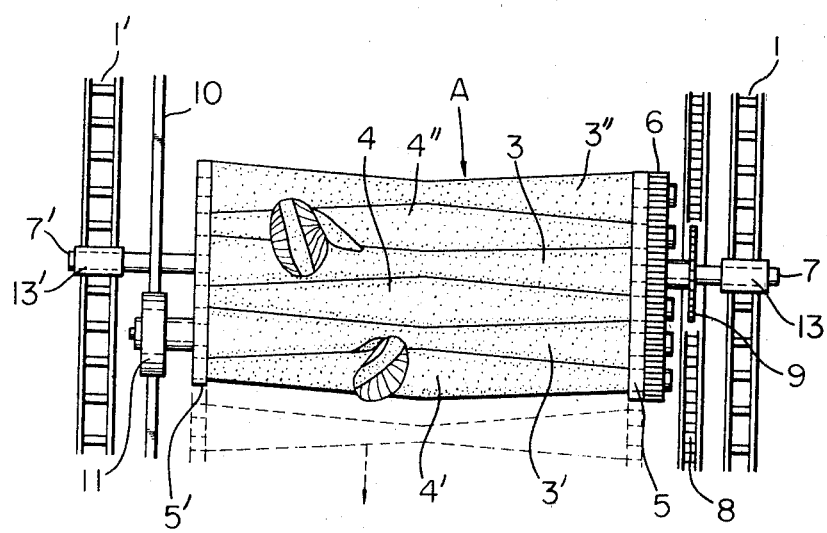
FIG. 3 is an enlarged scale fragmentary plan view of said apparatus of FIG. 1.
Figure 4:
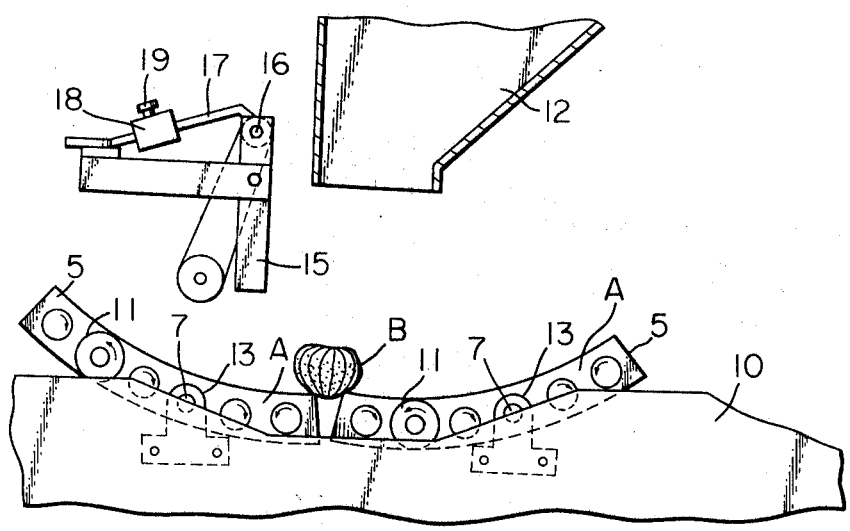
FIG. 4 is a fragmentary side elevational view of the rocking mechanism for the citrus fruit loculus removing units of said fruit processing apparatus.

Referring to FIGS. 2 and 3 further, each roll-type fruit loculus removing unit A is rockably supported at substantially the center in its length by each pair of opposite shafts 7 and 7' and one of the shafts, for example, the shaft 7 in the illustrated embodiment has a pinion 9 adjacent to the inner end secured hereto and a rack 8 is provided on the machine framework (not shown) by a substantial distance along the passage of the chain conveyor 1 for engagement with and rotating the pinions 9 of the support shaft 7 for each the roll-type loculus removing units A. The rolls 3, 3', 3'', 4, 4' and 4'' of each loculus removing unit A have at the ends adjacent to the pinion 9 small gears 6 all of which have the same diameters and which are in engagement with one another so that adjacent gears 6 may rotate in the opposite directions at the same peripheral speed as the roll 3 which is rotated first of all the other rolls in the associated loculus removing unit A because the roll 3 is operatively connected to the drive shaft 7 the pinion 9 on which engages the rack 8 to be rotated thereby. As seen in FIGS. 2, 3 and 4, the shaft of the roll 3' extends outwardly of the supporting arc shaped plate 5' of the associated loculus removing unit A and the shaft extension has an idle roller 11 rotatably supported thereon. An undulatory guide 10 having a continuous wave-like surface is secured to the machine frame by any suitable means (not shown) substantially all along the passage of the upper run of the conveyor chain conveyor 1' in a contact relation with the above-mentioned idle roller 11 and as the conveyor 1' moves along the passage in the arrow direction of FIG. 1, the rollers roll up and down along the wavelike surface and accordingly, the series of loculus removing units A move in the same direction while rocking by the wave-like surface of the undulatory guide 10. As will be understood from the configuration of the surface of the undulatory guide 10, the idle rollers 11 roll up and down about their axes while the loculus removing units A move in a seesaw movement by the up-and-down movement of the idle roller 11. Reference numeral 12 denotes a hopper for feeding prepared citrus fruits, for example, tangerines from a suitable supply source (not shown) and intermittently feeds the material onto the moving citrus fruits loculus removing units A. For the purpose, the hopper 12 is provided with a movable bottom (not shown) which is normally closed and intermittently opened in a predetermined time interval as will be described hereinbelow. A tray or receptacle 14 in the form of a chute is fixedly provided on the machine frame (not shown) by any suitable means (not shown) below the upper run of the chain conveyors 1 and 1' for receiving the loculi removed from the fleshes of the tangerines during a cycle of operation. As seen in FIG. 2, the receptacle 14 extends transversely of the passage of the chain conveyors 1 and 1' and inclines downwardly toward one side of the apparatus so that the removed loculi may slide down the receptacle to the lower end thereof where a loculus collecting bin (not shown) is disposed for receiving the removed loculi from the hopper 12. The driving sequence of the various rolls of each loculus removing unit A will be briefly described. When the chain conveyor 1 is driven in the manner as described hereinabove, the pinion 9 fixed on the unit supporting shaft 7 rotates because of its meshing with the stationary rack 8 so as to rotate the shaft of the roll 3 which is operatively connected to the unit supporting shaft 7. Thus driven roll 3 rotates the small gear 6 which meshes with the similar gears 6 of the adjacent rolls 4 and 4" whereby the gears 6 of these rolls 4 and 4" are caused to rotate in the opposite direction to that of the gear 6 of the roll 3. Since the small gears 6 of the rolls 4 and 4" are in meshing with the similar gears 6 of the rolls 3' and 3", the rolls 3' and 3" rotate in the opposite direction to that of the rolls 4 and 4", respectively. Finally, the roll 4' is rotated in the opposite direction to that of the adjacent roll 3' the gear 6 of which is in mesh with that of the roll 4'.

As mentioned above, the tangerines usually have various different sizes from one to another and the larger tangerines may be sometimes hard to be nipped between the adjacent rolls of the moving loculus removing units A because they tend to leap up over the rolls as they are discharged on the rolls. Therefore, according to the present invention, in order to make it possible to satisfactorily process such larger tangerines, a specific holding down device is provided in the machine frame (not shown) adjacent to and inwardly spaced from the hopper 12. As shown in FIG. 4, the holding down device comprises a pair of vertical pillar members 15 which positioned above the chain conveyors 1 and 1', a horizontal cross bar 16 extending between and connecting the upper ends of the pillar members, and a plurality of levers 17 each pivotally connected at the junction between its arms to the cross bar 16 and having a roller rotatably supported at the lower end of one arm. The other arm of each lever 17 has a weight 18 thereon by means of a set screw 19. Furthermore, according to the present invention, for limiting the downward movement of the levers 17 there are provided plurality of stops secured to the upper surface of a horizontal cross plate member (not shown) extending between and supported by a pair of opposite brackets which are in turn secured at the outer ends to the pair of pillar members 15, respectively. The intermittent opening movement of the bottom of the hopper 12 is so related to the seesaw rocking movement of the loculus removing units A that during the chain conveyors 1 and 1' are moving along the passage carrying the loculus removing units A thereon when the idle roller 11 of the preceding one of selected two adjacent units A is positioned on one "wave crest" of the wave-like surface of the undulatory guide 10 while the idle roller 11 of the succeeding one of the two units is positioned clearance on one "wave bottom," where the dimensions of the clearance between the two units is smallest sufficient to prevent the tangerines from falling into the bottom is opened so as to permit some of the tangerines to fall through the now opened hopper bottom onto both the selected adjacent moving two loculus removing units A bridging the clearance therebetween. As mentioned just above, since tangerines are permitted to fall onto both the two selected moving units A only when the clearance between the adjacent units A is small sufficient enough to prevent the tangerines from falling therein, the tangerines may be safely disposed on both the adjacent units A even they are of the smallest sizes. Even if the tangerines happen to fall in the clearance between the two adjacent units A, they will not be damaged or crushed down by the adjacent units because the last roll of the rearmost unit A and the foremost roll of the succeeding unit A are arranged to rotate in the arrow directions or the opposite directions as seen in FIG. 4 so as to push the fallen tangerine or tangerines up onto the succeeding one of the selected units A whereupon the pushed-up tangerine or tangerines may be allowed to tumble over the several of rolls of the moving succeeding one of the units A. On the other hand, if the prepared tangerines A include larger size ones which can not be easily tumbled over successive rolls of the loculus removing units A and tend to leap up from one roll to another due to their elasticity as the units rock in the seesaw movement as they move along the passage, according to the present invention the leaping movement of such larger size tangerines can be easily restrained by the above-mentioned holding-down device, i.e., when the larger size tangerines leap from one roll to another of the loculus removing unit A, the roller or rollers at the one arm of the lever or levers 7 strike against the leaped tangerines A to hold them against one or more rollers of one of or both the selected adjacent loculus removing units A so that the held tangerines A may be tumbled over successive rolls of the succeeding removing unit of the two selected ones for satisfactory removal of their loculi. For the purpose, the rollers at the lower end of the lever arms are normally positioned above the surface of the rolls of the moving removing units on the conveyors by a distance substantially corresponding to the height of a mean size of tangerine and held in this position by the weights 18 on the other arms of the levers 17. Since the levers 17 are pivotally supported on the cross bar 16, the position of the rollers of the levers 17 can be easily altered by the pivotal movement of the levers depending upon the sizes of the tangerines A to be processed. Furthermore, in any of the series of loculus removing units A, since the outermost rolls are so positioned that they may not be positioned below the plane of the center rolls of the removing unit A in any portion of the rocking movement of the removing units, once the tangerines A are disposed on the removing unit they will not fall down from the unit in any way.

In operation, assuming that a supply of prepared citrus fruit such as tangerines B to be processed has been received in the hopper 12, one of the transverse shafts at the inlet and discharge ends on which the pairs of sprocket wheels 2, 2 and 2', 2' are fixedly mounted is driven by any suitable driving means (not shown). The rotational movement of the drive shaft is transmitted to the two sprocket wheels associated with the drive shaft and the driven sprockets in turn drive the chain conveyors 1 and 1' which in turn drive the other or driven transverse shaft on which the two other sprocket wheels are fixedly mounted whereby the latter sprocket wheels are also driven. As the chain conveyors 1 and 1' are moving along the predetermined passage within the apparatus in the manner as mentioned above, the loculus removing units A rockably supported on the conveyors also move along the predetermined passage while rocking in a seesaw movement because the free rollers 11 associated with the units A move in contact with the wave-like surface of the undulatory guide 10. During the rocking movement of the loculus removing units A in the manner as mentioned just above, the bottom of the hopper 12 is opened by the suitable means (not shown) when the free roller 11 of the preceding loculus removing unit of two selected adjacent units supported on the then upper run of the conveyors 1 and 1' is positioned on one "wave crest" of the undulatory guide 10 while the idle roll 11 of the other or succeeding unit of the selected adjacent units is positioned on one "wave bottom" of the same guide 10 whereby some of the tangerines B may be allowed to fall onto both the selected two adjacent units A bridging the clearance therebetween. In this case, as mentioned above, since the clearance between the two selected loculus removing units A is the smallest sufficient to prevent the smallest sizes of tangerines from falling in the clearance, scarcely no tangerine will be caught in the clearance to be damaged or crushed down. And if any, the fallen tangerine or tangerines may be pushed up by the rearmost roll of the preceding loculus removing unit A and the foremost roll of the succeeding loculus removing unit A which rotate in the opposite directions to one another. As mentioned above, the tangerines to be processed by the novel processing apparatus have been prepared, i.e., they have been removed their outer skins therefrom and segmented into individual loculus-covered forms or maintained in their integral states. After having been disposed on both the selected moving loculus removing units A, a portion or portions of the loculus which surround the fleshes of the prepared tangerines B are pinched between adjacent rolls in each removing unit and as the removing units move toward the discharge end of the apparatus while rocking in the seesaw movement, the prepared tangerines B are tumbled over successive rolls in the succeeding unit from one end toward the center of the removing unit A with the loculi C caught between the adjacent rolls onto which the tangerines A were first disposed. Therefore, before the selected two loculus removing units A on which the tangerines A processed reach the discharge end of the apparatus, the fleshes of such tangerines A will have been completely stripped of the loculi. The thus stripped fleshes D are transferred onto the chute which carries the fleshes to the subsequent station where they are subjected to further treatments. On the other hand, the removed loculi C are forced through between the adjacent opposite directionally rotating rolls of the removing units A onto the below receptacle 14 from where the trashes are taken out of the apparatus.

And the peripheral surface of the rolls of the loculus removing units A may be imparted with somewhat elasticity by covering the surface with a sheet of flexible carpet or alternatively, the peripheral surface of these rolls may be formed of any suitable elastic material having a plurality of projections thereon so that the frictional resistance by the rolls for nipping the tangerine loculi may be increased resulting in improvement of loculus nipping. In addition, even the tangerines A are caused to tumble over the rolls while beig stripped of their loculi the fruit fleshes can be effectively prevented from being bruised.

Although a preferred embodiment of the present invention has been described and illustrated herein, it is to be understood that the same is illustrative in nature and not to be necessarily limiting upon the scope of the teaching in its broader aspect. Many additional variations within the scope of the appended claims will occur to those skilled in the art.

What is claimed is:

1. A prepared citrus fruit processing apparatus comprising a framework; a pair of laterally spaced and parallel chain conveyors trained over sprocket wheels rotationally mounted on said framework at the inlet and discharge ends of said apparatus for movement along a predetermined passage within the apparatus, each chain conveyor having the upper run travelling from said inlet end to said discharge end; drive means journalled in said framework for driving said chain sprockets; a plurality of fruit processing means rockably supported on said chain conveyors in an end-to-end spaced relation; and a hopper disposed adjacent to and above said inlet end for receiving a supply of prepared fruit and discharging said fruit onto two selected ones of said fruit processing means, characterized by that each of said fruit processing means comprises plural pairs of side-by-side arranged rolls each pair including two compensatively different-shaped rolls which rotate in the opposite directions and each two adjacent rolls in each fruit processing means have compensatively different shapes and rotate in the opposite directions with a slight clearance therebetween so that the loculus of said fruit may be pinched by the opposite peripheral surfaces of the adjacent rolls as the rolls rotate in the opposite direction.

2. A prepared citrus fruit processing apparatus as set forth in claim 1, in which each of said fruit processing means further comprises a pair of laterally spaced sector plates in which the opposite ends of said rolls in plural pairs are journalled in such a manner that all the rolls may be disposed in different planes and said fruit processing means are supported along the length of said chain conveyors in an end-to-end spaced relation by supporting means provided on the conveyors at spaced positions thereon.

3. A prepared citrus fruit processing apparatus as set forth in claim 1, said rocking movement of each of the fruit processing means is effected by a free roller rotationally supported at one end of the shaft for one of said rolls in each fruit processing means and a stationary undulatory guide provided on said framework with which said free roll contacts to be rotated thereby as said chain conveyors move along said passage.

4. A prepared citrus fruit processing apparatus as set forth in claim 1, in which said apparatus further comprises a holding down device disposed adjacent to and inwardly spaced from said hopper in a position above the upper run of said chain conveyors so that when said fruit is discharged onto two selected ones of said processing means the fruit is prevented from leaping up one roll to another of either or both of the selected processing means and caused to tumble over the rolls of the succeeding one of the selected adjacent processing means with their loculi pinched between adjacent rolls, said holding down device including a pivotal lever one arm of which has a roller at the lower end for engagement with said fruit discharge on said selected processing means and the other arm has a weight mounted thereon for controlling the height of said roller relative to the selected processing means.

References Cited

UNITED STATES PATENTS 2,676,633   4/1954   Lohre et al. _____ 146—49

FOREIGN PATENTS 1,120,918   4/1956   France.

W. GRAYDON ABERCROMBIE, Primary Examiner

U.S. Cl. X.R.

146—49, 55